US011922515B1

(12) United States Patent
Lombard et al.

(10) Patent No.: US 11,922,515 B1
(45) Date of Patent: Mar. 5, 2024

(54) METHODS AND APPARATUSES FOR AI DIGITAL ASSISTANTS

(71) Applicant: Peppercorn AI Technology Limited, Cardiff (GB)

(72) Inventors: Nigel Lombard, Bridgend (GB); Paul Cassidy, Crewe (GB); Atul Thakor, Bury (GB); Robert Rushton, Swansea (GB); Ian Law, Newport (GB); Christopher Hill, Ordnance Wharf (GI); Jonathan Byford, Cardiff (GB); Jonathan Wilshire, Surrey (GB); Andrew Snuggs, London (GB)

(73) Assignee: Peppercorn AI Technology Limited, Cardiff (GB)

( * ) Notice: Subject to any disclaimer, the term of this patent is extended or adjusted under 35 U.S.C. 154(b) by 0 days.

(21) Appl. No.: 18/141,101

(22) Filed: Apr. 28, 2023

(51) Int. Cl.
*G06Q 40/00* (2023.01)
*G06F 40/103* (2020.01)
*G06F 40/284* (2020.01)
*G06F 40/40* (2020.01)
(Continued)

(52) U.S. Cl.
CPC ........... *G06Q 40/08* (2013.01); *G06F 40/103* (2020.01); *G06F 40/284* (2020.01); *G06F 40/40* (2020.01); *G06N 20/00* (2019.01)

(58) Field of Classification Search
CPC ..... G06Q 40/08; G06F 40/103; G06F 40/284; G06F 40/40; G06N 20/00
See application file for complete search history.

(56) References Cited

U.S. PATENT DOCUMENTS

| 7,546,382 | B2 | 6/2009 | Healey |
| 8,767,948 | B1 | 7/2014 | Riahi |
| 11,030,990 | B2 * | 6/2021 | Jiang ..................... G10L 13/047 |

(Continued)

FOREIGN PATENT DOCUMENTS

| RU | 2 796 208 | * | 4/2022 | |
| WO | WO-2019005348 | A1 * | 1/2019 | ........... G06F 16/243 |
| WO | WO-2019245939 | A1 * | 12/2019 | ......... G10L 15/1815 |

OTHER PUBLICATIONS

Potha et al., "Cyberbullying Detection using Time Series Modeling," IEEE International Conference on Data Mining, 2014 (Year: 2014).*

(Continued)

*Primary Examiner* — Abhishek Vyas
*Assistant Examiner* — William B. Bunker
(74) *Attorney, Agent, or Firm* — Caldwell Intellectual Property Law

(57) ABSTRACT

Platform-agnostic digital assistant methods and apparatuses are provided. The apparatuses and methods include a processor configured by a memory to receive user data from a storage containing informational contents. The processor is configured to establish a communication channel with an entity and utilize the communication channel to receive first information related to a user. The processor is configured to extract at least one user datum from the first information and modify the informational contents of the storage based on at least one of the user datum and the first information. The processor is further configured to initiate an action related to the user based on at least one of the first information, the user datum, and the informational contents.

14 Claims, 7 Drawing Sheets

(51) Int. Cl.
   *G06Q 40/08*     (2012.01)
   *G06N 20/00*     (2019.01)

(56)         References Cited

U.S. PATENT DOCUMENTS

| | | | |
|---|---|---|---|
| 2017/0243267 | A1* | 8/2017 | Lamberton ......... G06F 21/6218 |
| 2018/0225365 | A1* | 8/2018 | Altaf .................. G06F 16/3344 |
| 2018/0365212 | A1* | 12/2018 | Banerjee ................ H04L 51/02 |
| 2019/0005024 | A1* | 1/2019 | Somech ................ G06F 16/243 |
| 2019/0189126 | A1* | 6/2019 | Liu .......................... G10L 15/22 |
| 2019/0266999 | A1* | 8/2019 | Chandrasekaran ..... G10L 15/16 |
| 2020/0012954 | A1* | 1/2020 | Botea ...................... G06F 40/35 |
| 2020/0395008 | A1* | 12/2020 | Cohen .................. G06F 40/268 |
| 2021/0065019 | A1* | 3/2021 | Alkan .................... G06N 20/00 |
| 2021/0124843 | A1 | 4/2021 | Vass |
| 2022/0374956 | A1* | 11/2022 | Jungmeisteris ...... G06Q 30/016 |
| 2023/0137166 | A1* | 5/2023 | Annadata ................ H04L 51/04 |
| | | | 709/206 |

OTHER PUBLICATIONS

Unknown, "Voice-based responses customized to user personality," IPCOM000256325D, 2018 (Year: 2018).*

Adrian Bridgwater, "IBM Watson Gets Smarter Artificial Intelligence—Language, Vision, and Speech," www.forbes.com; 2015 (Year: 2015).*

* cited by examiner

METHODS AND APPARATUSES FOR AI DIGITAL ASSISTANTS

FIELD OF THE INVENTION

The present invention generally relates to the field of artificial intelligence and machine learning. In particular, the present invention is directed to methods and apparatuses for AI digital assistants.

BACKGROUND

Customers expect increasingly seamless and convenient service from companies they interact with, but frequently dislike needing to wait for customer support or learn how to use a form or website just to fill out information. In particular, customers and users have an ever-increasing number of communications channels through which they communicate with friends, family, businesses, and organizations, but frequently do not have the option of getting assistance for certain matters through the communications channels they use most often.

SUMMARY OF THE DISCLOSURE

In an aspect, a platform-agnostic digital assistant is provided. The apparatus includes a processor and a memory communicatively coupled to the processor. The memory contains instructions configuring the processor to receive user data from a storage containing informational contents. The instructions further configure the processor to establish a communication channel with an entity. The instructions further configure the processor to utilize the communication channel to receive a first information related to a user between the processor and the entity and extract at least one user datum from the first information. The instructions further configure the processor to modify the informational contents of the storage based on at least one of the user datum and the first information. The instructions further configure the processor to initiate an action related to the user based on at least one of the first information, the user datum, and the informational contents.

In another aspect, a platform-agnostic digital assistant is provided. The apparatus includes a processor and a memory communicatively coupled to the processor. The memory contains instructions configuring the processor to receive user data from a storage containing informational contents. The instructions further configure the processor to establish a communication channel with an entity. The instructions further configure the processor to utilize the communication channel to exchange first information related to a user between the processor and the entity and extract at least one user datum from the first information. The instructions further configure the processor to modify the informational contents of the storage based on at least one of the user datum and the first information. The instructions further configure the processor to initiate an action related to the user based on at least one of the first information, the user datum, and the informational contents.

In another aspect, a method for providing platform-agnostic digital assistance is provided. The method includes receiving, by a processor, user data from a storage containing informational contents. The method further includes establishing, by the processor, a communication channel with an entity. The method further includes utilizing, by the processor, the communication channel to receive a first information related to a user between the processor and the entity extracting, by the processor, at least one user datum from the first information. The method further includes modifying, by the processor, the informational contents of the storage based on at least one of the user datum and the first information. The method further includes initiating, by the processor, an action related to the user based on at least one of the first information, the user datum, and the informational contents.

In another aspect, a method for providing platform-agnostic digital assistance is provided. The method includes receiving, by a processor, user data from a storage containing informational contents. The method further includes establishing, by the processor, a communication channel with an entity. The method further includes utilizing, by the processor, the communication channel to exchange first information related to a user between the processor and the entity extracting, by the processor, at least one user datum from the first information. The method further includes modifying, by the processor, the informational contents of the storage based on at least one of the user datum and the first information. The method further includes initiating, by the processor, an action related to the user based on at least one of the first information, the user datum, and the informational contents.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for AI-powered digital assistants. Customers and users, for instance customers and users of an insurance company, frequently have a large number of communication channels they use such as email, text message, paper mail, messaging apps, social media direct messaging functionality, and the like. This can lead to a preferential mode of communication for a user or entity. However, these preferential modes of communication are not always available to a user or entity for communicating with an organization or other business. This can lead to a reduction in convenience, loss of useful time, and/or loss of user business. The present disclosure provides apparatuses and methods for communicating information about a user in a natural language format to increase user convenience, and which may operate in a platform-agnostic manner, in other words operate using a communication channel not explicitly designed for communication between the user or entity and organization.

Figure 1:
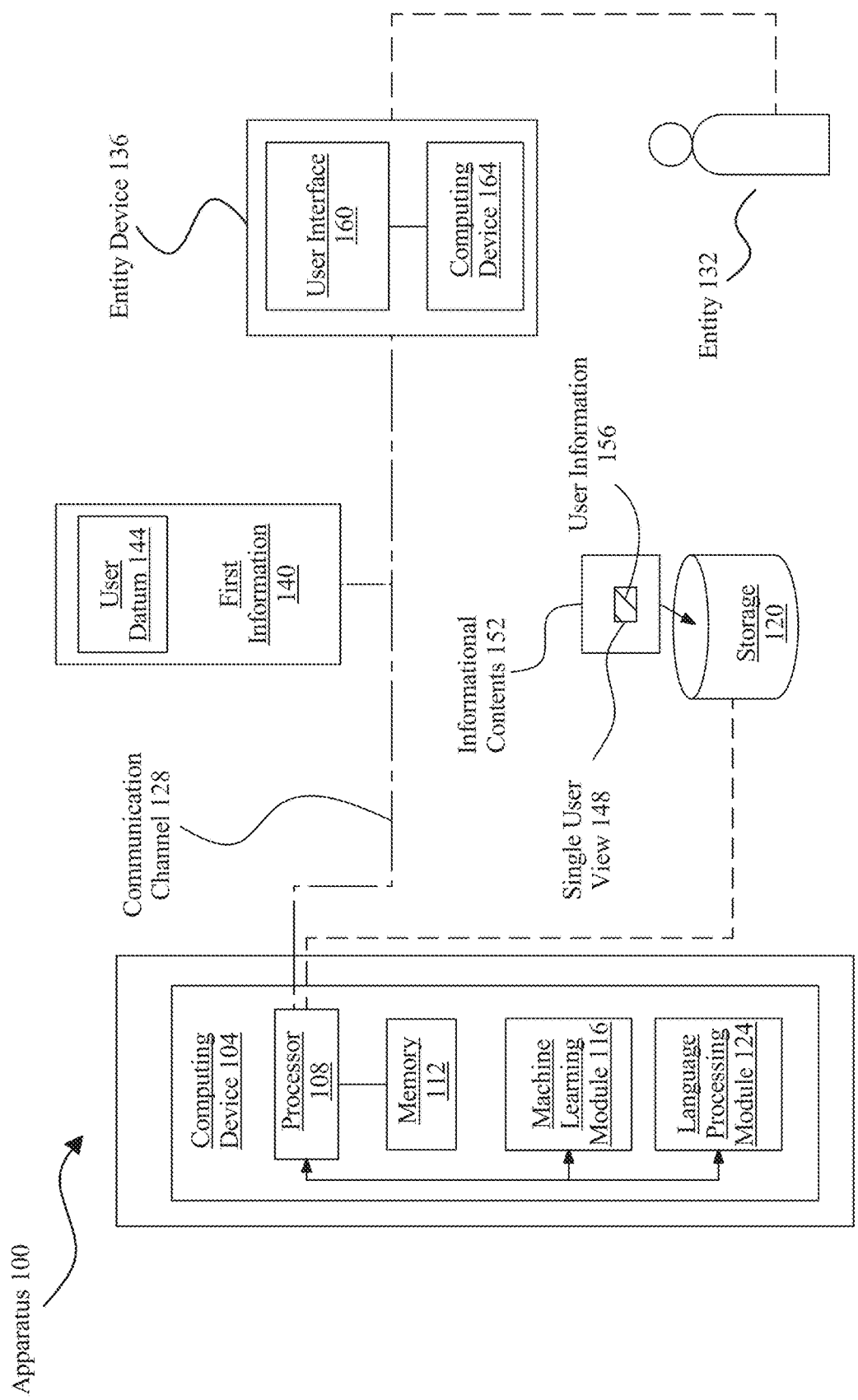
FIG. 1 is a flow diagram illustrating a platform-agnostic digital assistant apparatus in accordance with the invention.

Referring now to FIG. 1, an exemplary embodiment of a platform-agnostic digital assistant apparatus 100 is illustrated. Apparatus 100 includes a computing device and a processor. Processor may include, without limitation, any processor described in this disclosure. Processor may be included in a computing device. A digital assistant may be an algorithm, computer program, method or method steps, chatbot, AI construct, trained machine learning model, or the like, that assists a person or entity in a matter related to one or more elements of information. A computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single computing device operating independently, or may include two or more computing device operating in concert, in parallel, sequentially or the like; two or more computing devices may be included together in a single computing device or in two or more computing devices. A computing device may interface or communicate with one or more additional devices as described below in further detail via a network interface device. Network interface device may be utilized for connecting a computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A computing device may include but is not limited to, for example, a computing device or cluster of computing devices in a first location and a second computing device or cluster of computing devices in a second location. A computing device may include one or more computing devices dedicated to data storage, security, distribution of traffic for load balancing, and the like. A computing device may distribute one or more computing tasks as described below across a plurality of computing devices of computing device, which may operate in parallel, in series, redundantly, or in any other manner used for distribution of tasks or memory between computing devices. A computing device may be implemented, as a non-limiting example, using a "shared nothing" architecture.

With continued reference to FIG. 1, a computing device and/or processor may be designed and/or configured to perform any method, method step, or sequence of method steps in any embodiment described in this disclosure, in any order and with any degree of repetition. For instance, a computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, an apparatus 100 includes a computing device 104. The computing device 104 includes a processor 108, a memory 112. In some embodiments, the computing device 104 may include a machine learning module 116. The processor 108 is communicatively coupled with the memory 112 and machine learning module 116. The memory 112 contains instructions stored thereon configuring processor 108 to perform any method or process in accordance with this disclosure. In an embodiment, processor 108 is communicatively coupled with a storage 120. "Storage" is defined as any device capable of storing information. Storage 120 may be any data storage in accordance with this disclosure including a hard drive, cloud storage, distributed cloud storage, server, solid-state hard drive, magnetic tape storage, paper, written records, an object containing an indication of data or a datum, and the like. Storage 120 contains informational contents. "Informational contents" are defined herein are one or more datum elements that contain, store, or indicate information. Informational contents may include any data capable of being stored electronically. Informational contents stored on storage 120 are described in further detail with reference to FIG. 2. In some embodiments, storage 120 may include a database. A database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Computing device 104 may further include optional language processing module 124.

With continued reference to FIG. 1, processor 108 is further configured to establish communication channel 128 with an entity 132 using entity device 136. Communication channel 128 may convey first information 140 including user datum 144. Data stored on storage 120 may further include single user view 148, informational contents 152, and user information 156. Entity device 136 may further include user interface 160 and computing device 164.

With continued reference to FIG. 1, apparatus 100 may be platform agnostic. As used herein, "platform agnostic" is defined as able to utilize or communicate through a plurality of distinct communications platforms, channels, systems, and apparatuses regardless of a designed purpose of the respective communications platforms, channels, systems, and apparatuses. Apparatus 100 may be able to utilize any one of the below communications channels or any combination of the below communications channels in order to perform a desired function.

With continued reference to FIG. 1, processor 108 is further configured to establish a communication channel 128 with an entity 132 using entity device 136. A "communication channel," as used herein, is defined as a medium for conveying or transmitting information. For example, information may include physical media, digital media, or both. An "entity" is defined as a person, user, business, organization, computer system, computer program, chatbot, AI construct, or the like. Further, any non-human entity referenced herein may include human entities that would be associated with said non-human entity by one of ordinary skill in the art. For example, a reference to a legal entity such as a municipal court should be understood to include any human entities that one of ordinary skill in the art would associate with a municipal court, such as a lawyer, a judge, a clerk, a bailiff, a police officer, a receptionist, a government official, and the like. In an embodiment, examples of a communication channel 128 may include email, phone call, paper mail, package mail, a delivery courier or service, a shipping service, satellite call, text message, text chat, voice chat, web form, messaging app (e.g. WhatsApp, Signal, Facebook Messenger, etc.), smartphone app (e.g. Instagram, Snapchat, TikTok), computer program, web interface, web program, webpage, API, social media platform (e.g. tweeting on Twitter), social media platform internal messaging medium (e.g. Twitter direct message), or any suitable communication channel 128 as would be known to one of ordinary skill in the art.

With continued reference to FIG. 1, processor 108 may utilize a third-party platform to establish or maintain the communication channel 128. A "third-party platform" as used herein is defined as a system, computer program, or apparatus that is maintained or operated by a party other than entity 132. A third-party platform may be a social media network and related communication means. For example, apparatus 100 may interact with an entity 132 by being presented in a format according to a social media network. For example, apparatus 100 may be presented as a Facebook profile, a Twitter account or handle, a TikTok profile, and the like. Apparatus 100 may accordingly utilize communication functionality built into the social media network or associated apps, such as a direct messaging functionality built into a social media smartphone app.

With continued reference to FIG. 1, an entity 132 may be a user or may not be a user. For example, an entity may be an insurance company formerly used by a user, a bank, a government entity such as an agency, a business entity (such as an LLC, a corporation, a business partner, and the like), a legal or law enforcement entity (such as a court, a police station, a private investigator, a lawyer, a judge, and the like), a human associated with a user (e.g. a friend, a spouse, a parent, a child, an acquaintance, current or former coworker, a boss, and the like), a credit agency, a source of public records, a school attended by or associated with a user, an employer, or the like.

With continued reference to FIG. 1, the processor 108 is further configured to utilize the communication channel 128 to receive first information 140 related to a user from the entity 132. The processor 108 may be further configured to utilize the communication channel 128 to exchange first information 140 related to a user between the processor 108 and the entity 132. "First information," as used herein, is defined as information exchanged between processor 108 and entity 132 or information transmitted by entity 132. In an embodiment, first information 140 may include two portions: a first portion generated by processor 108 while the second portion of first information 140 is generated by entity 132. First information may include information related to a user (such as identifying information, information regarding a user insurance policy, information related to physical characteristics, employment information), information related to communication channel 128 (such as a customer support telephone number or email, a help website, a mailing address, etc.), information related to insurance (such as information indicating the initiation, modification, updating, or cancellation of insurance coverage for a user or associated person, filing a claim, a quote for insurance coverage, a user policy, and the like), information related to an event (such as a car accident involving the user's car, a tree falling on a user's house, the birth of a child for which user requires additional health insurance coverage), information related to the exchange (e.g. a greeting such as "Hello", a question, parts of speech, components of language (e.g. phonology, morphology, syntax, semantics, pragmatics, vocabulary, grammar, lexicography, and the like), and the like. First information 140 may include information related to an entity 132 if the entity is different from the user. In an embodiment, first information 140 may indicate a subject indirectly or directly. For example, first information 140 may include a direct indication that an entity 132 wishes to file a claim, such as the sentence "I want to file a claim". In an alternative embodiment, first information 140 may include an oblique or indirect indication that an entity 132 wishes to file a claim, such as the sentence "Some guy just ran into my car. How do I get his insurance to take care of this?"

With continued reference to FIG. 1, processor 108 is further configured to extract at least one user datum from the first information 140. "User datum," as used herein, is defined as an element of information related to a user. User datum 144 may include user identifying information (such as name, address, social security number, age, height, weight, health, and the like), information related to a communication involving a user (such as an email, a phone call, a text message, a website help chat message, a voicemail, information communicated through a form, information communicated through a webpage or the internet, information communicated in person, mailed information, faxed information, written information, and the like, where any of the foregoing may be from a user or from a different entity), insurance information relating to a user (such as current policy coverage, policy dates, policy costs, a deductible, a policy rate, claims filed, and the like), information related to a user's suitability for coverage (such as criminal record, credit score, employment information, instances of fraud or suspected fraud, employment history, trustworthiness, and the like), and the like. User datum 144 may be any information used by apparatus 100 to initiate at least one action related to the user.

With continued reference to FIG. 1, processor 108 may extract at least one user datum 144 from the first information 140 by analyzing portions of first information 140 generated by entity 132. Analyzing portions of first information 140 generated by entity 132 may include utilizing language processing methods to identify words in portions of first information 140 generated by entity 132. Processor 108 may retrieve a list of keywords from memory 112, storage 120, or another suitable source, and compare the identified words from portions of first information 140 generated by entity 132. For example, portions of first information 140 generated by entity 132 may include the sentence "I need to file a claim." Processor 108 may then parse the sentence and identify the individual syntactic elements "I" "need" "to" "file" "a" and "claim" and would additionally identify the "." as indicating the end of the sentence. Processor 108 may then compare the individual words with the list of keywords and identify any matches. The keywords used by processor 108 may be linked to a defined function, for example by a person manually associating keywords with a defined function or by a computing device such as computing device 104 programmed to create an association between a keyword and a defined function, for instance by extracting words contained in comments of computer code for a particular function. For example, a computing device such as computing device 104 may receive instructions that a particular piece of software performs the process of filing a claim. Computing device 104 may then extract all of the comments associated with the particular piece of software and use those as keywords for a defined function. In the above example, processor 108 may identify the keywords "file" and "claim" and initiate a predefined claim filing process based on the association between those keywords and the process. Processor 108 may extract at least one user datum 144 by generating the following prompt: "Ok, I'll get that claim process started for you. What's your account number?" Entity 132 may then generate an additional portion of first information 140, such as: "My account number is 55375914." Processor 108 may then analyze the replied portion of first information 140 generated by entity 132 by parsing the reply and searching for a number consisting of a predetermined number of digits, such as eight. The processor 108 may then compare the account number to a database associating account numbers and user identifying information and determine that account number 55375914 belongs to user Bill Jones and is therefore a valid user datum 144. Processor 108 may then begin the process of filing a claim based on information contained in Bill Jones' stored user information 156.

With continued reference to FIG. 1, the processor 108 is configured to modify the informational contents of the storage 120 based on at least one of the user datum 144 and the first information 140. As used herein in relation to information or data, "modify" means creating, updating, modifying, annotating, marking, noting, notating, or deleting the information or data or a reference to the information or data. For example, processor 108 may store the entirety of first information 140 on storage 120 as a record of the communication between entity 132 and apparatus 100. In an alternative embodiment, processor 108 may store user datum 144, a portion of first information 140, all of first information 140, additional information implied by first information 140, determinations made by processor 108 based on first information 140 and/or user datum 144, or any combination thereof. For example, processor 108 may modify the informational contents of storage 120 to reflect that a claim should be filed for user Bill Jones with account number 55375914 and store a task datum indicating that an insurance adjustor should be scheduled to travel to Bill Jones' residence to assess damages.

With continued reference to FIG. 1, modifying informational contents of storage 120 may include modifying user identifying information (for example updating a user weight, updating a user disability, creating a user profile when onboarding a new user, deleting a user profile for a user who leaves an insurance company operating apparatus 100, and the like), modifying policy coverage for a user (for example adding additional coverage for a new car, changing a policy rate for a user home following the construction of an addition, deleting coverage for a boat based on a user selling the boat, adding a new policy for a newborn child, and the like), modifying information pertaining to a user received from a non-user entity (for example receiving an updated user credit score from a credit bureau and modifying the contents of storage 120 to reflect the updated user credit score, updating user information 156 to reflect an arrest record received from a federal court, deleting a user profile upon receiving an indication that a user has passed away, and the like), modifying insurance parameters for a user (for example an insurance rate, a deductible, a maximum payout, a maximum level of coverage, and the like).

With continued reference to FIG. 1, processor 108 is further configured to initiate at least one action related to the user based on the first information 140. An "action" as used herein, is a process or operation performed to achieve a goal, objective, or outcome. For example, a processor 108 may initiate at least one action related to the user based on the first information 140 by scheduling the at least one action, updating data associated with a user to reflect the desired action, transmitting a communication regarding the action with one or more persons, computer programs, apparatuses, systems or the like, selecting a computer program, person, or other entity to execute the action, by performing the entirety of the specified action, and the like. Instructions contained on memory 112 may configure processor 108 to initiate at least one action related to the user based on information contained in first information 140. For example, first information 140 may contain keywords that processor 108 is configured to identify as explained in detail herein. Memory 112 may contain instructions associating those keywords with one or more predefined actions that processor 108 is configured to initiate. Upon identification of those keywords in first information 140, processor 108 may initiate the corresponding at least one action.

With continued reference to FIG. 1, processor 108 may be further configured to create a single user view 148 by agglomerating user information 156 from one or more sources including the first information 140. "User information," as used herein, is defined as information related to a user. User information 156 may be any information that processor 108 determines is related to a user. One or more sources may be any source of information listed herein, including insurance information, stored user information, banking information, legal information, occupational information, publicly available information, first information 140, social media information, entity communication information, credit bureau information, and the like. Processor 108 may determine one or more elements of information is related to a user by parsing or otherwise analyzing the one or more elements and identifying information linked to a user. The one or more elements of information can be any source or type of information disclosed herein or that would be obvious to one of ordinary skill in the art. For example, processor 108 may parse one or more elements of information and determine that the one or more elements of information contain a key: value pair such as {"User name": "Bill Jones"} and accordingly identify that the information is user information for Bill Jones. Alternatively or additionally, processor 108 may compare values or words in the one or more elements of information with keywords or existing information stored on storage 120, memory 112, or any other source that processor 108 may be communicatively coupled with. A "single user view" as used herein is defined as a collection of information about a user gathered from different sources. For example, a single user view 148 may collect banking information about a user from a bank (for example recent purchases, number of accounts, net worth, overdraft fees, loans including vehicle loans, etc.), social media information about a user from a public social media profile, (e.g. social media posts, pictures (such as a picture of a fender bender the user was in recently), videos (such as a video of a user speeding or driving carelessly), comments, and the like), credit score and related credit information from a credit bureau, legal information from public or background check records (e.g. an arrest record, outstanding warrants, convictions for particular crimes such as fraud, and the like) and agglomerate the user information 156 into a single source. Such a centralized collection of information can help make a more accurate or faster determination about whether or not a user is trustworthy, what an appropriate insurance policy or insurance rate might be for a user, how to reduce risk related to a user, and the like.

With continued reference to FIG. 1, processor 108 may agglomerate user information 156 from one or more sources using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to scrape data associated with the user from user related social media and networking platforms. The web crawler may be seeded and/or trained with a user's social media handles, name, and common platforms a user is active on. The web crawler may be trained with information received from a user through a user interface, such as user interface 160 and computing device 164 on entity device 136. A "user interface," as used in this disclosure, is a means by which the user and a computer system interact, including the use of input devices and software. For example, a user may input into a user interface, social media platforms they have accounts on and would like to retrieve user data from. "User data," as used herein, is data stored based on its relation to a user. A user interface may include a graphical user interface (GUI), command line interface (CLI), menu-driven user interface, touch user interface, voice user interface (VUI), form-based user interface, and the like. Computing device 104 may receive information such as a user's name, platform handles, platforms associated with the user and the like, from the user interface. In some embodiments, user database may be populated with data associated with the first user and the second user received from the user interface. In an embodiment, user interface 160 may comprise a speaker and/or microphone. In an embodiment, user interface 160 may include a display (such as a light emitting diode (LED) display, liquid crystal, quantum dot LED (QLED), organic LED (OLED), active-matrix organic LED (AMOLED), Super AMOLED, and the like), touch screen, or digital writing device. User interface 160 may comprise one or more means for receiving user input such as a keypad, keyboard, mouse, button, touchscreen, touchpad, knob, dial, slider, switch, or the like. User interface 160 may comprise one or more means for providing output such as a display, screen, speaker, vibrating motor (such as the type for vibrating smartphones), LED, light, buzzer, alarm, or the like. A web crawler may be generated by a computing device 104. In some embodiments, a web crawler may be configured to generate a web query. A web query may include search criteria. Search criteria may include photos, videos, audio, user account handles, web page addresses and the like received from the user. A web crawler function may be configured to search for and/or detect one or more data patterns. A "data pattern" as used in this disclosure is a matched characteristic of a plurality of information. For example, a data pattern may include, but is not limited to, features, phrases, repeated words, repeated data elements, overlapping classes of data elements, and the like as described further below in this disclosure. The web crawler may work in tandem with any machine-learning model, digital processing technique utilized by computing device 104, and the like as described in this disclosure. In some embodiments, a web crawler may be configured to determine the relevancy of a data pattern. Relevancy may be determined by a relevancy score. A relevancy score may be automatically generated by a computing device 104, received from a machine learning model, and/or received from the user. In some embodiments, a relevancy score may include a range of numerical values that may correspond to a relevancy strength of data received from a web crawler function. As a non-limiting example, a web crawler function may search the Internet for photographs of the user based on one or more photographs received from entity 132. The web crawler may return data results of photos of the user and the like. In some embodiments, the computing device may determine a relevancy score of each data element retrieved by the web crawler. In one embodiment, at least one user datum 144 is extracted after first information 140 is processed.

With continued reference to FIG. 1, processor 108 may agglomerate user information 156 to create a single user view 148 by storing information identified as user information 156 in a single database, a single file, on a single data storage location such as storage 120, on multiple data storage locations but with a single index indicating what information is stored where, from multiple data sources but presented or displayed in a single interface, in a single physical record such as a piece of paper, plural proximal pieces of paper (e.g. paper stapled together, placed in the same folder, marked with the same identifying information, etc.), or otherwise presenting, storing, displaying, or accessing user information 156 in a manner that associates information with a particular user. Processor 108 may store a single user view 148 in a predetermined format such as a database, a dictionary, a list, a text file, an encrypted file, a blockchain, a ledger, a spreadsheet, a comma-separated values (CSV) file, a file separated by any other delineator, and the like.

With continued reference to FIG. 1, processor 108 may be further configured to modify the informational contents of storage 120 based on the single user view 148. For example, processor 108 may store a single user view 148 on storage 120, modify an existing single user view 148 stored on storage 120 with new information, modify informational contents 152 to incorporate previously missing information based on information received by processor 108 in first information 140, user datum 144, or otherwise included in single user view 148, and the like.

With continued reference to FIG. 1, first information 140 may be exchanged in a natural language format. A "natural language format" as used herein is defined as a format for communicating information corresponding to a style of speaking, writing, signing or otherwise using a language that naturally occurs or might naturally occur between a plurality of humans communicating in that language. For example, a natural language format may simulate a format that a user would utilize when speaking with another person such as a friend, a coworker, a spouse or partner, a child, a parent, or the like. Processor 108 may generate prompts, questions, responses, or related components included in first information 140 in a natural language format. For example, an exchange of first information 140 between processor 108 and entity 132 may take the following format:

| | |
|---|---|
| Entity 132 | "Hey, can I update my policy?" |
| Digital Assistant Apparatus via processor 108 (DAA) | "Sure! What do you need to update?" |
| Entity 132 | "I just moved to a new address." |
| DAA | "I can help you with that. What's the new address? Congrats on the move btw!" |
| Entity 132 | "1450 East Willow Drive, Pembroke Pines, FL, 33028" |

The natural language format may allow the exchange of first information 140 to seem or feel more natural to entity 132 and reduce or eliminates the need for an entity 132 to be instructed or trained on how to input information into a digital assistant system or apparatus such as apparatus 100.

With continued reference to FIG. 1, processor 108 may exchange first information 140 in a natural language format by determining one or more language elements from the first information 140 or from any suitable information element disclosed herein. Processor 108 may determine one or more language elements from the first information 140 using a language processing module 124. Processor 108 and/or language processing module 124 may operate to generate a language processing model. Language processing module 124 may include any hardware and/or software module. "Language elements" as used herein are defined as one or more components of a language. Language elements may include one or more phonological elements, morphological elements, syntactic elements, semantic elements, pragmatic elements, vocabulary elements, grammatical elements, lexicographical elements, and the like. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimiter. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model. Processor 108 and/or language processing module 124 may receive one or more elements of first information 140 and parse the one or more elements of first information 140 into any language elements identified above.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module 124 may use a corpus of documents to generate associations between language elements in a language processing module 124, and processor 108 may then use such associations to analyze words extracted from one or more documents and determine that the one or more documents indicate significance of a category. In an embodiment, language processing module 124 and/or processor 108 may perform this analysis using a selected set of significant documents, such as documents identified by one or more experts as representing good information; experts may identify or enter such documents via graphical user interface, or may communicate identities of significant documents according to any other suitable method of electronic communication, or by providing such identifications to other persons such as entity 132 who may transmit such identifications to processor 108. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 108 may automatically obtain the document using such an identifier, for instance by submitting a request to a database or compendium of documents such as JSTOR as provided by Ithaka Harbors, Inc. of New York.

With continued reference to FIG. 1, processor 108 may determine one or more language elements in first information 140 by identifying and/or detecting associations between one or more language elements (including phonemes or phonological elements, morphemes or morphological elements, syntax or syntactic elements, semantics or semantic elements, and pragmatic elements) extracted from at least first information 140, including without limitation mathematical associations, between such words. Associations between language elements and relationships of such categories to other such term may include, without limitation, mathematical associations, including without limitation statistical correlations between any language element and any other language element and/or Language elements. Processor 108 may compare an input such as a sentence from first information 140 with a list of keywords or a dictionary to identify language elements. For example, processor 108 may identify whitespace and punctuation in a sentence and extract elements comprising a string of letters, numbers or characters occurring adjacent to the whitespace and punctuation. Processor 108 may then compare each of these with a list of keywords or a dictionary. Based on the determined keywords or meanings associated with each of the strings, processor 108 may determine an association between one or more of the extracted strings and a function of an organization that is operating apparatus 100, such as an association between a string containing the word "premium" and an insurance company that is operating apparatus 100. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, determining one or more language elements in first information 140 by identifying and/or detecting associations between one or more language elements may allow for the interpretation of entity-generated portions of first information 140 that may not follow traditional rules of grammar, spelling, punctuation, speaking, or other aspects of communication. For example, processor 108 may be able to interpret "bro cn u hlp me get car inchurins" as a request to initiate coverage for a vehicle. Processor 108 may accomplish this interpretation by determining associations between language elements. For example, processor 108 may associate the phoneme "u" with the syntactic element "you," which processor 108 may be programmed to interpret as the insurance organization that owns apparatus 100. Processor 108 may further break down "inchurins" into component phonemes or syllables such as "in," "chur" and "ins" and correlate each with the syllables of "insurance," thereby identifying that the entity 132 is making an inquiry related to insurance.

With continued reference to FIG. 1, processor 108 may be configured to determine one or more language elements in the first information 140 using machine learning. For example, language processing module 124 and/or processor 108 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 124 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, processor 108 may be configured to determine one or more language elements in the first information 140 using machine learning by first creating or receiving language classification training data. "Training data," as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by processor 108, machine learning module 116, and/or language processing module 124 may correlate any input data as described in this disclosure to any output data as described in this disclosure.

With continued reference to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ă/, and /t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and or run using processor 108, machine learning module 116, language processing module 124, or another computing device. Language classification training data may create associations between any type of language element in any format and other type of language element in any format. Additionally or alternatively, language classification training data may associate language element input data to functionality related to an operator of apparatus 100. For example, language classification training data may associate occurrences of the syntactic elements "get," "car," and "insurance," in a single sentence with the functionality of insuring a vehicle provided by an operator of apparatus 100, for instance a car insurance company.

With continued reference to FIG. 1, processor 108 may additionally create or receive operator functionality training data containing associations between language elements and one or more functionalities provided by an operator of apparatus 100, such as an insurance company. Operator functionality training data may associate language elements such as words, phrases, or other language elements with particular functions performed by an operator of apparatus 100. For example, operator functionality training data may contain associations between the phrase "new customer" and an onboarding process, between the word "claim" and a claims initiation process, between a phrase containing a social security number, a name, and the phrase "arrested for fraud" with a process for terminating coverage based on a user being arrested for fraud.

With continued reference to FIG. 1, processor 108 may additionally create or receive entity communication style training data containing associations between language elements and one or more entity communication styles. Entity communication style training data may correlate any aspect of groups (A) and (B), where (A) includes any one or more of associate average, median, mode, standard deviation, variance, and similar parameters for sentence length for an entity, sentence length for a representative population or entities, word length for an entity and/or representative population of entities, words used in a sentence by an entity 132 or representative population of entities, statistics for word choice, particular word frequency, number or statistical occurrence (e.g. mean, median, mode, standard deviation, and the like) of spelling errors in a sentence, in an entire communication, or an entire single user view 148, or any aspect of user datum 144, single user view 148, or the like, device metadata such as device type (e.g. smartphone, tablet, laptop computer, desktop computer, kiosk, etc.), software information (e.g. browser type, device operating system, email service, email address, phone carrier, phone number, screen name or social media handle, etc.), device identifier (e.g. IP address, MAC address, geofencing or geolocation data, device serial number, etc.), communication mode (e.g. written, spoken, email, text message, voice call, home digital assistant, social media platform, etc.), and (B) includes any one or more of a particular weight, probability, numerical descriptor, and/or verbal descriptor of mood, state of mind, personality type, class of behaviors, or subsequent action for apparatus 100 or processor 108 to take or implement. For example, entity communication style training data may contain associations between statistical parameters of communications between entities and digital or other assistants based on word choice frequency (e.g. occurrence of one or more keywords in a communication) and a classification of entity 132 and/or appropriate action for processor 108 to take or implement.

With continued reference to FIG. 1, processor 108 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 108 may then calculate a likelihood table by calculating probabilities of different data entries and classification labels. Processor 108 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 108 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, once language classification training data is created or received by processor 108, a dynamic response machine learning model may be trained using the language classification training data by processor 108, machine learning module 116, language processing module 124, or another device. In a non-limiting embodiment, language classification training data is submitted to a machine-learning model, which generates a trained dynamic response machine learning model based on the correlated relationship or relationships between language elements. For instance, and without limitation, a linear regression model, generated using a linear regression algorithm, may use a linear combination of language input data using coefficients derived during machine-learning processes to calculate a language element output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from language classification training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired natural language output values at the output nodes. This process is sometimes referred to as deep learning.

With continued reference to FIG. 1, once entity communication style training data is created or received by processor 108, a dynamic response machine learning model may be trained using the entity communication style training data by processor 108, machine learning module 116, language processing module 124, or another device. In a non-limiting embodiment, entity communication style training data is submitted to a machine-learning model, which generates a trained dynamic response machine learning model based on the correlated relationship or relationships between entity communication styles. For instance, and without limitation, a linear regression model, generated using a linear regression algorithm, may use a linear combination of communication statistical parameter and/or device metadata input data using coefficients derived during machine-learning processes to calculate an entity communication style output datum and/or an optimal response output datum, such as a response having the highest probability of resolving a customer's need. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from language classification training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired entity communication style output values at the output nodes.

With continued reference to FIG. 1, processor 108 may be configured to utilize a trained dynamic response machine learning model to generate dynamic response information based on portions of first information 140 generated by entity 132. For example, a trained dynamic response machine learning model may receive a sentence or similar written communication from entity 132 as an input. The trained dynamic response machine learning model may then generate written output corresponding to the information and style of the input from entity 132, such as a response to a question asked by entity 132 or an indication that a process would be started based on the entity 132's input. Processor 108 may create dynamic response information in a particular communication style, such as a style identified by processor 108 as being associated with entity 132. A "communication style," as used herein, is defined as a pattern of language elements or manner of arranging language elements. For example, processor 108 may be trained with language classification training data associating particular words, phrases, or language elements with a particular style of communication such as a formal writing style, a short and/or clipped writing style, a verbose speaking style, a minimal speaking style, a particular accent for a speaking style, a gendered voice, and the like. For example, entity 132 may indicate via first information 140 "Can you give me a quote for car insurance? Just tell me a deductible and monthly price." Processor 108 may then generate a dynamic response of "Deductible: $500. Monthly price: $136." Additionally or alternatively, entity 132 may indicate via first information 140 "i dont understand why my monthly premium is so high my car is so old can you explain that to me in dtail?" to which the processor may generate a dynamic response of "While your vehicle is 15 years old, it only has 23,000 miles on it, which is ⅕ as many miles as the average for that make and model year. Your vehicle therefore has more than double the Kelly Blue Book value than the average vehicle of that make and model year and is accordingly more expensive to insure."

With continued reference to FIG. 1, processor 108 may be further configured to adapt a natural language format based on one or more language elements according to a determined entity communication style in the first information 140. For example, processor 108 may have a default communication style when exchanging first information 140. Processor 108 may receive direct or indirect feedback from an entity 132 indicating that the entity would prefer a different communication style. For example, an entity 132 may explicitly request via first information 140 "Could you use smaller words please?" Processor 108 may then prioritize using words that were six characters in length or less. As an additional or alternative example, an entity 132 named Joseph may have a casual writing style and may say something like "y do u talk like a robot, bro?" Processor 108 may input this phrase into dynamic response machine learning model and receive an output better reflecting Joseph's implied preference for a more casual writing style such as "my b broseph i aim 2 please" instead of "My apologies Joseph, I aim to please." This can allow for a user to feel more comfortable with digital assistant apparatus 100 and may encourage a user to be more forthcoming with relevant information such as user datum 144 related to insurance coverage, a credit score, any outstanding legal issues, and the like. Processor 108 may additionally or alternatively determine an entity communication style based on communication received from entity 132 over time, communication in single user view 148, entity communication style determined from first information 140 by language classification machine learning model, communication style determined from other sources of data such as a social media profile associated with entity 132, and the like.

With continued reference to FIG. 1, entity communication style may include, be indicative of, or be determined based on a variety of factors and characteristics. For example, entity communication style may be indicative of certain types of behaviors, moods, state of mind, sentiments (e.g., angry, in a hurry, vulnerability), and the like. Entity communication style may inform what the "next best action" for a user might be. For example, if processor 108 determines entity 132 is angry because of a car accident, what the most effective next action processor 108 should take to mitigate the issue that entity 132 is experiencing. Processor 108 may determine statistical parameters such as average, median, mode, standard deviation, variance, and similar parameters, for any aspect of user datum 144 or entity communication. For example, processor 108 may determine average, median, mode, standard deviation, variance, and similar parameters for: sentence length for an entity, sentence length for a representative population or entities, word length for an entity and/or representative population of entities, sentence length for an entity or representative population of entities, words used in a sentence by an entity 132 or representative population of entities, "Representative population," as used herein, is defined as a plurality of objects, people, or entities sharing at least one predetermined similarity with a corresponding object, person, or entity. A "predetermined similarity," as used herein, is defined as a value for a characteristic within a threshold amount from a reference characteristic. For example, an entity 132 may have 15 years of academic education. A representative population for entity 132 may include entities with 15±2 years of academic education. In an embodiment, processor 108 may correlate a frequency of one or more words or one or more word types to a particular mood, personality type, or class of behaviors. For example, processor 108 may determine a mood, personality type, or class of behaviors based on a frequency of profanity. For example, processor 108 may be configured by instructions contained on memory 112 to determine that an average sentence length for a representative population corresponding to entity 132 may be 17.3 words, with a standard deviation of 2.2 words and an average of 0.1 instances of profanity per sentence. Processor 108 may compare data from single user view 148 for entity 132 to the representative population and classify an entity's mood as negative based on an increased occurrence of profanity in a communication from entity 132. For example, processor 108 may count the occurrences of one or more words labeled by instructions contained on memory 112 as profanity and additionally count the number of sentences in the communication from entity 132. Processor 108 may then divide the number of instances of profanity by the number of sentences to determine the instances of profanity per sentence. Processor 108 may then subtract the average instances of profanity per sentence for a representative population from instances of profanity per sentence in a communication from entity 132. If the resulting difference is a positive number above a threshold, for example 0.5 instances of profanity per sentence or higher, processor 108 may classify entity 132 as having a negative mood. Processor 108 may similarly determine probabilities of entity 132 being in one or more classes of moods based on an entity communication style. For example, processor 108 may assign a probability that entity 132 is happy, angry, frustrated, impatient, relaxed, and the like, based on any of the above statistics including, but not limited to, statistics for word choice, particular word frequency, sentence length, number or statistical occurrence (e.g. mean, median, mode, standard deviation, and the like) of spelling errors in a sentence, in an entire communication, or an entire single user view 148, or any aspect of user datum 144, single user view 148, or the like.

With continued reference to FIG. 1, processor 108 may be configured by instructions contained on memory 112 to determine a descriptor, mood, classification, and/or entity communication style for an entity 132 based on communication characteristics such as spelling, typos, mistakes, instances of deleting characters or words, time taken to write or communicate, time required for an entire interaction, pauses between words, sentences, and or responses, and the like. Processor 108 may receive input from a user interface 160 such as keystrokes, keystroke timing, voice recordings, facial or other visual recordings, phonemes, syllables, and other spoken or written characteristics of communication, and the like. Processor 108 may determine any of the statistics listed above (e.g. mean, median, mode etc.) for keystrokes, keystroke timing, voice recordings, facial or other visual recordings, phonemes, syllables, and other spoken or written characteristics of communication, and the like to determine an entity communication style. For example, processor 108 may be configured by instructions contained on memory 112 to determine that when more than 15% of keystrokes input by an entity 132 into a keyboard are the "Backspace" key, used to delete words or characters, the entity 132 may be confused or unsure. Processor 108 may determine a classifier weight or percent probability that an entity 132 should be classified to a particular mood category, user description, entity communication style, or the like based on any of the above statistical parameters. For example, processor 108 may determine a classifier weight or percent probability that an entity 132 should be classified as "angry" based on a mathematical difference between a total number of typographical errors in first information 140 and an average number of typographical errors in one or more examples of communications from a representative population of entities. In an additional or alternative embodiment, processor 108 may determine and utilize statistical and/or comparative parameters (e.g. statistics, mathematical differences, sums of values, weights of values, probabilities, etc.) of any communication characteristics such as spelling, typos, mistakes, instances of deleting characters or words, time taken to write or communicate, time required for an entire interaction, pauses between words, sentences, and or responses, and the like. Processor 108 may additionally or alternatively determine entity communication style and/or other aspects of user information 156 and/or single user view 148 based on device metadata such as device type (e.g. smartphone, tablet, laptop computer, desktop computer, kiosk, etc.), software information (e.g. browser type, device operating system, email service, email address, phone carrier, phone number, screen name or social media handle, etc.), device identifier (e.g. IP address, MAC address, geofencing or geolocation data, device serial number, etc.), communication mode (e.g. written, spoken, email, text message, voice call, home digital assistant, social media platform, etc.), and the like. For example, processor 108 may increase a probability from 70% to 75% that an entity 132 is a safe driver based on device location data from a smartphone repeatedly showing the entity 132 driving at or below the speed limit on a route.

With continued reference to FIG. 1, processor 108 may adapt the natural language format by receiving training data correlating exemplary language elements with exemplary communication styles, training a machine learning model using the received training data, and generating one or more natural language outputs corresponding to the determined entity communication style by inputting, to the trained machine learning model, at least one of the first information and the single user view and receiving the one or more natural language outputs from the trained machine learning model. For example, one or more natural language outputs may include an action for an entity 132 that processor 108 determines is the next best action for the entity 132 to take based on the information communicated to processor 108 from entity 132, single user view 148, or any suitable source. For example, processor 108 may receive or generate communication style training data correlating language elements with communication styles in accordance with training data creation methods disclosed herein. Communication style training data may then be used to train a communication style machine learning model which receives one or more language element inputs and outputs a determined communication style that processor 108 may use to place a higher weight on pre-programmed responses, outputs an adjusted weighting for combinations of language elements that may be used by dynamic response machine learning model, or a similar output. Alternatively, communication style training data may be used in conjunction with dynamic response training data and used to train a single dynamically styled communication response machine learning model. The trained dynamically styled communication response machine learning model may then receive one or more of first information 140, single user view 148, and/or elements of informational contents 152 from storage 120 as an input and output not only an appropriate natural language response to the input but determine an appropriate natural language response style for the output as well.

With continued reference to FIG. 1, is some embodiments, dynamic response machine learning model may be trained as a function of a communication style. As a non-limiting example, if a communication style is "casual," dynamic response machine learning model may be trained only on training data that is labeled "casual." As another non-limiting example, if a communication style is "professional," dynamic response machine learning model may be trained only on training data that is labeled "professional." In some embodiments, a dynamic response machine learning model may be selected as a function of a communication style. As a non-limiting example, if a communication style is "casual," processor 108 may select a dynamic response machine learning model that is trained only on training data that is labeled "casual." As a non-limiting example, if a communication style is "professional," processor 108 may select a dynamic response machine learning model that is trained only on training data that is labeled "professional."

With continued reference to FIG. 1, processor 108 may utilize one or more trained machine learning models in combination to interpret communications from entity 132 and initiate or perform a corresponding action related to one or more functions of an operator of digital assistant apparatus 100. For example, processor 108 may first input entity 132 communication from first information 140 into language classification machine learning model to parse and identify what a particular communication is directed to, feed the output from language classification machine learning model into dynamic response machine learning model to determine an appropriate natural language response to an entity communication, and feed the output from dynamic response machine learning model into operator functionality machine learning data to determine what operation or process (such as onboarding a user, filing a claim, adding coverage, etc.) was indicated to entity 132 and should potentially be initiated by an operator of apparatus 100.

With continued reference to FIG. 1, in one embodiment, processor 108, machine learning module 116, language processing module 124, and/or another computing device may utilize machine learning methods like Hidden Markov Models (HEIM), Support-Vector Machine SVM etc. HMMs as used herein are statistical models with inference algorithms that that may be applied to the models. In such models, a hidden state to be estimated may include an association between an extracted word, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 124 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, processor 108, machine learning module 116, language processing module 124, and/or another computing device may utilize Optical Character Recognition or Optical Character Reader (OCR), Optical Word Recognition (OWR), Handwritten Text Recognition (HTR), Intelligent Character Recognition (ICR), or Intelligent Word Recognition (IWR) configured to automatically convert images of written (e.g., typed, handwritten or printed text) into machine-encoded text. In some cases, OCR may recognize written text, one glyph or character at a time. In some cases, OWR may recognize written text, one word at a time, for example, for languages that use a space as a word divider. In some cases, ICR may recognize written text one glyph or character at a time, for instance by employing machine learning processes. In some cases, IWR may recognize written text, one word at a time, for instance by employing machine learning processes as disclosed herein. For example, processor 108 may receive an image file as part of first information 140, user datum 144, single user view 148, informational contents 152, and/or user information 156. The image file may be a scanned copy of a handwritten arrest report indicating that a user was arrested recently for theft. Processor 108 may use OCR to determine the contents of the handwritten arrest report. For example, processor 108 may use OCR to analyze the handwriting in the report and extract a user's name and a reason for an arrest. The processor 108 may then determine if an adjustment to an insurance policy should be made. For example, using OCR techniques as described herein, processor 108 may determine that a user was arrested for speeding. Processor 108 may be configured by instructions contained on memory 112 to initiate a predetermined process of increasing a user's monthly car insurance premium based on the arrest record.

With continued reference to FIG. 1, handwriting recognition techniques can be broadly classified into two types: online methods and offline methods. Online methods involve the utilization of digital stylus and have access to stroke information and pen location while text is being written by the first user. Online methods provide real-time information with regards to the flow of text being written by the first user which can be classified at a high accuracy rate and the demarcation between different characters in the text becomes much clearer. In many cases, handwriting movement can be used as input to various handwriting recognitions. As such, instead of merely using shapes of glyphs and words, motions, such as the order in which segments are drawn, the direction, and the pattern of putting the pen down and lifting it are captured. Online methods are also referred to as online character recognition, dynamic character recognition, and real-time character recognition. However, not all users are available to accommodate the online methods. In contrast, offline methods are more common as they involve recognizing text once it is written down. In one embodiment, the handwriting recognition techniques may be "offline" processes, which analyze a static document or image frame.

With continued reference to FIG. 1, in some cases, OCR processes may employ pre-processing of an image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

With continued reference to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4-6.

With continued reference to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common representation of Washington, District of Columbia in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 108 may be further configured to determine an indemnity outlay based on the user datum 144. As used herein, "indemnity outlay" is defined as a currency value related to insurance. For example, processor 108 may determine that first information 140 includes user datum 144 indicating that a user's vehicle was totaled in an accident and will be written off as a total loss. Processor 108 may use this information to retrieve data related to a user's insured vehicle including value of the vehicle. Processor 108 may then determine an indemnity outlay to be paid out to a user corresponding to the value of the insured vehicle. An indemnity outlay may be a currency value corresponding to a claim amount, a deductible, a monthly insurance rate, a lawsuit settlement, and the like.

With continued reference to FIG. 1, the informational contents of storage 120 may contain an indemnity datum for the user. Processor 108 may be configured to identify a negative impact on the indemnity datum from the first information 140. "Indemnity datum" as used herein is defined as one or more elements of information related to insurance or indemnity coverage for a user. "Negative impact," as used herein, is defined as indicating lower favorability for a user. Examples of an indemnity datum include a credit score, a value indicating a user's trustworthiness (e.g. a rating, score, rank, weight, scale, value between a defined range, and the like), a bank account balance, and the like. For example, an indemnity datum may indicate an estimated percentage that a user will not file a claim within the next year, a ranking from 0-100 of a user based on consistency of monthly payments, and the like. A negative impact on the indemnity datum from the first information 140 may include a risk that a user might default on an insurance payment (e.g. a credit bureau report that a user's credit score decreased by 50 points, a bank statement showing a negative checking account balance, information from a former employer indicating the user lost their job), a risk that a user may file a fraudulent claim (e.g. a social media post from the user stating "I am going to file a fraudulent insurance claim," a legal record received from a municipal court indicating a prior arrest for insurance fraud, and the like), evidence of unethical conduct (e.g. an email mistakenly forwarded to an insurance company where the user meant to ask a friend how to stage a fire to receive a home insurance payment, and the like), and the like. For example, indemnity datum may contain information regarding a user's vehicle insurance coverage policy such as a 4% probability of a user causing the firm to need to pay out a settlement of $50,000 or more. Memory 112 may contain instructions configuring processor 108 to determine that a record of an arrest for felony speeding corresponds to a 275% increase in the probability (e.g., from 4% to 15%) that an insurance firm will be required to pay out a settlement of $50,000 or more. This may cause processor 108 to determine that insurance coverage for a user should be terminated.

Figure 2:
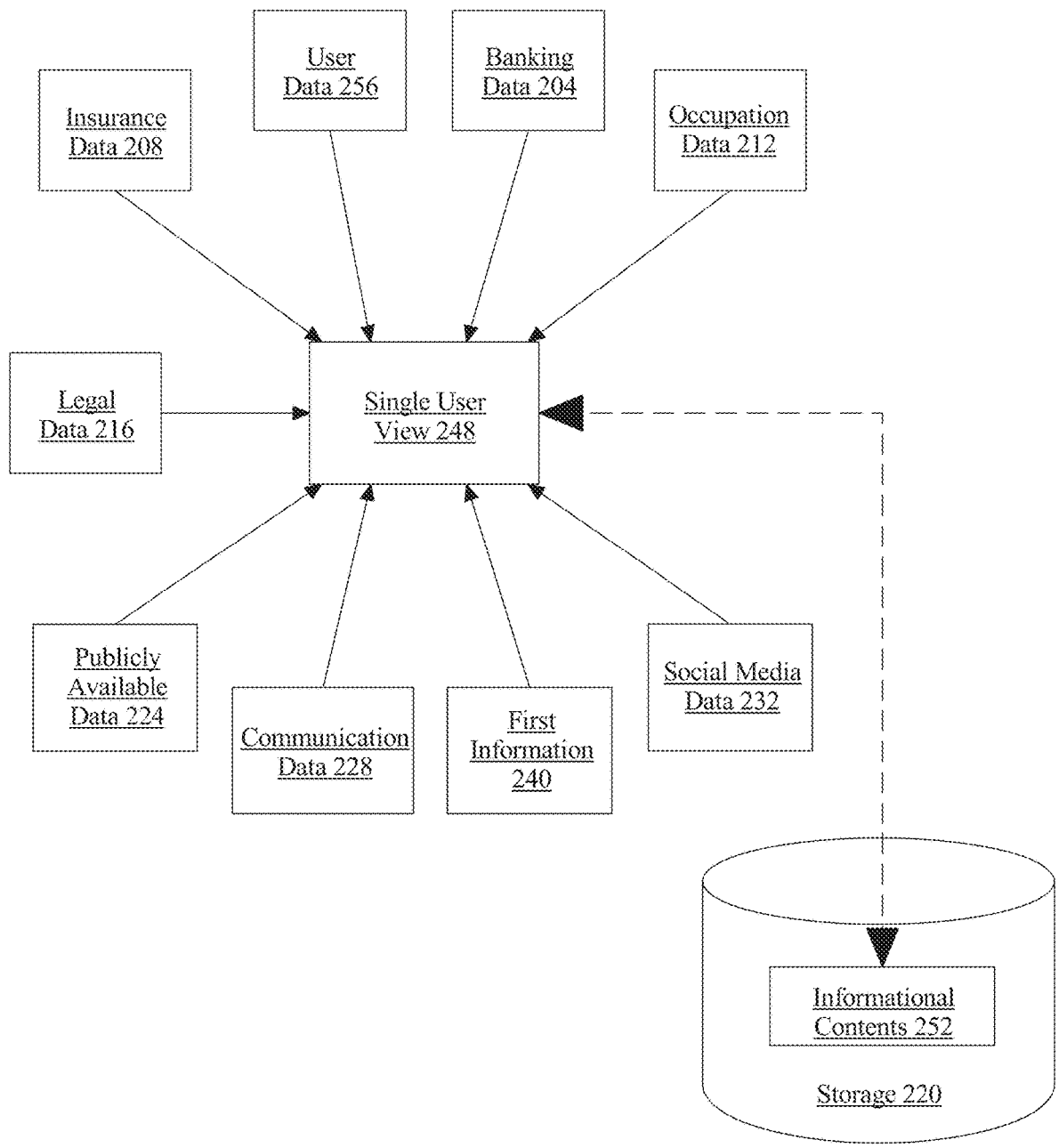
FIG. 2 illustrates information storage in accordance with the invention.

Now referencing FIG. 2, informational contents of FIG. 1 are explained in greater detail. Informational contents 252 may be stored on storage 220. Storage 220 may be the same or similar as storage 120. Data stored on storage 220 may be electronic data such as data stored on a hard drive, a database, a file, a ledger, a blockchain entry, a spreadsheet, a digitally-signed assertion, a bit, a byte, or any suitable data; informational contents may be writing or other linguistic information; informational contents may be visual information such as a picture, image, rendering, model, drawing, light, color, shape, and the like; informational contents may be audio information such as a sound, noise, syllable, word, phrase, semantic audio information, and the like. Informational contents may include single user view 248. Single user view 248 may include user data 256. User data 256 may include the same or similar information as user information 156 from FIG. 1, may include the same or similar information as user datum 144 from FIG. 1, may include user identifying information (name, address, social security number, age, height, weight, health, and the like), information related to a communication involving a user (such an email, a phone call, a text message, a website help chat message, a voicemail, information communicated through a form, information communicated through a webpage or the internet, information communicated in person, mailed information, faxed information, written information, and the like, where any of the foregoing may be from a user or from a different entity). Single user view 248 may include banking data 204 such as bank account information, balances, loans, overdraft fees, banking institution name, bank account number, routing number, bank address, bank headquarters location, and the like. Single user view 248 may include insurance data 208. Insurance data 208 may include data related to a user policy, covered people or objects, claims filed, monthly premium, deductible for one or more covered people or objects, length of time insured by an insurance organization, risk factors, insurance organization point of contact or points of contact for the user, insurance adjustor associated with the user, and the like. Single user view 248 may include occupation data 212. Occupation data 212 may include job title, job company, coworkers, boss, length of employment, hourly rate or salary, work location, and the like. Single user view 248 may include legal data 216. Legal data 216 may include court records, arrest records, non-privileged attorney communications, convictions, warrants, and the like. Single user view 248 may include publicly available data 224 such as newspaper articles, publicly available government filings, political office filings, interviews, public social media posts, and the like. Single user view 248 may include communication data 228 such as historical communications from an entity or user, communications between an organization and a user, requests from a user, any of electronic, paper, voice, or other communications, internal communications regarding a user from within an organization, and the like. Single user view 248 may include first information as referenced in FIG. 1. Single user view 248 may include social media data 232 such as social media posts, images, videos, direct messages, social media handles or user IDs, social media metadata such as where a user posts from, what device a user typically posts from, and the like.

Figure 3:
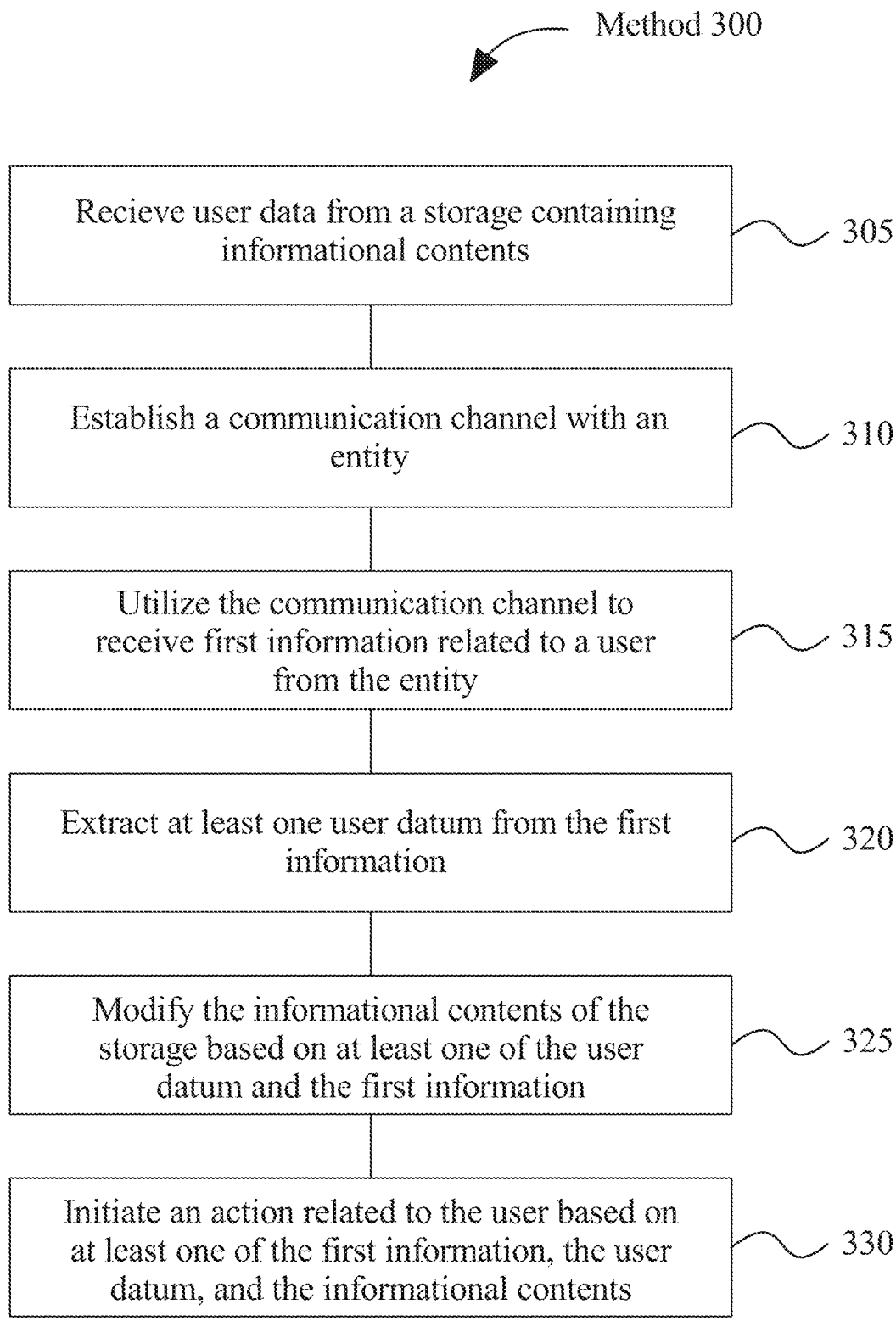
FIG. 3 is a flow diagram illustrating a method of platform-agnostic digital assistance.

Now referencing FIG. 3, a method 300 for platform-agnostic digital assistance is described. Method 300 comprises the steps of 305 receiving, by a processor, user data from a storage containing informational contents; 310 establishing, by the processor, a communication channel 128 with an entity; 315 utilizing, by the processor, the communication channel 128 to exchange first information related to a user between the processor and the entity; 320 extracting, by the processor, at least one user datum from the first information; 325 modifying, by the processor, the informational contents of the storage based on at least one of the user datum and the first information; and 330 initiating, by the processor, an action related to the user based on at least one of the first information, the user datum, and the informational contents.

Still referencing FIG. 3, step 305 comprises receiving, by a processor, user data from a storage containing informational contents. This step may be performed in accordance with processes performed by devices and apparatuses disclosed herein, including by apparatus 100 in FIG. 1.

Still referencing FIG. 3, step 310 comprises 310 establishing, by the processor, a communication channel 128 with an entity. This step may be performed in accordance with processes performed by devices and apparatuses disclosed herein, including by apparatus 100 in FIG. 1.

Still referencing FIG. 3, step 315 comprises utilizing, by the processor, the communication channel 128 to the communication channel to receive a first information related to a user from the entity. In some embodiments, this may include exchanging information related to the user between the processor and the entity. This step may be performed in accordance with processes performed by devices and apparatuses disclosed herein, including by apparatus 100 in FIG. 1

Still referencing FIG. 3, step 320 comprises extracting, by the processor, at least one user datum from the first information. This step may be performed in accordance with processes performed by devices and apparatuses disclosed herein, including by apparatus 100 in FIG. 1

Still referencing FIG. 3, step 325 comprises modifying, by the processor, the informational contents of the storage based on at least one of the user datum and the first information. This step may be performed in accordance with processes performed by devices and apparatuses disclosed herein, including by apparatus 100 in FIG. 1

Still referencing FIG. 3, step 330 comprises initiating, by the processor, an action related to the user based on at least one of the first information, the user datum, and the informational contents. This step may be performed in accordance with processes performed by devices and apparatuses disclosed herein, including by apparatus 100 in FIG. 1.

Figure 4:
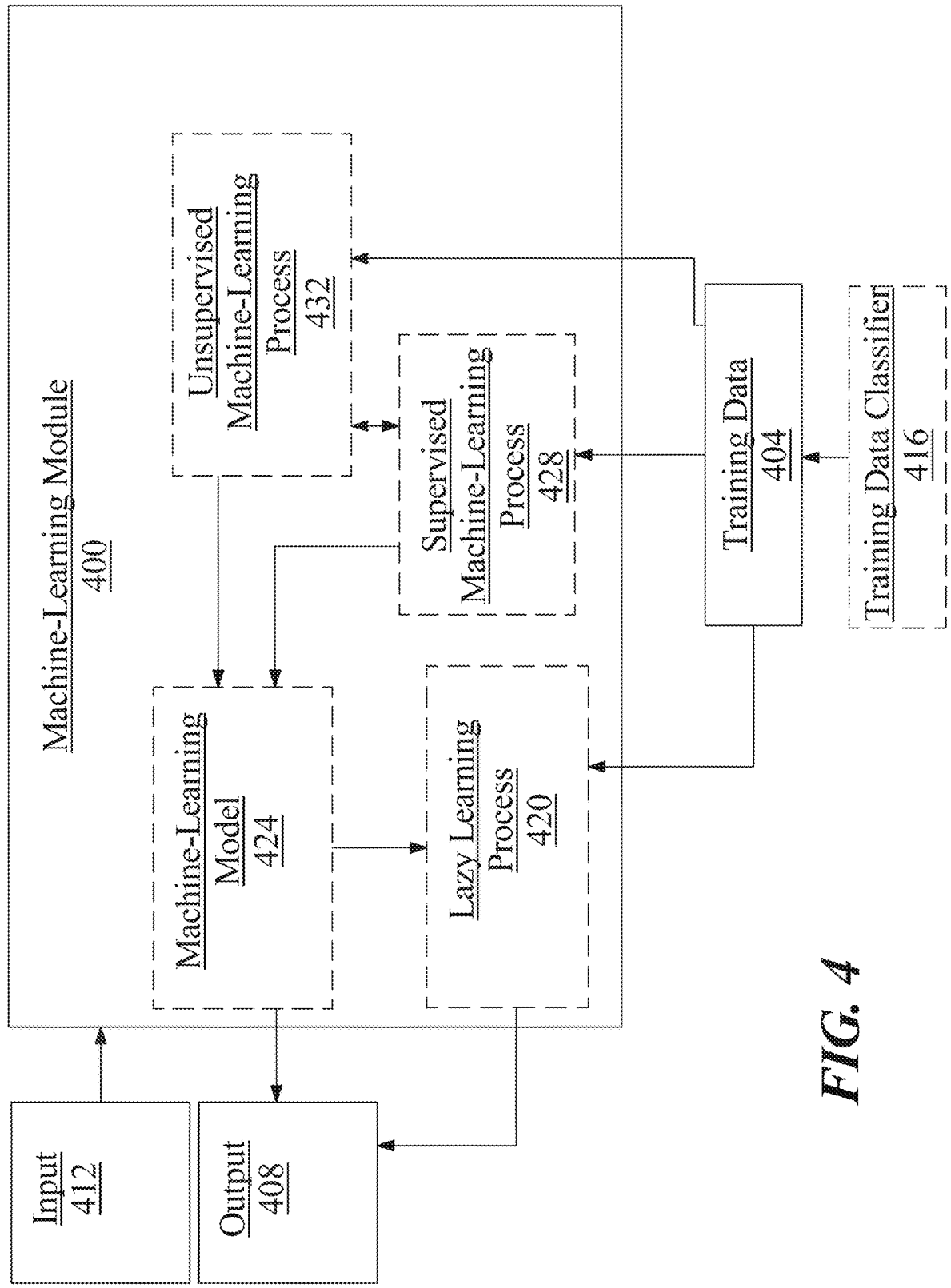
FIG. 4 a block diagram of an exemplary machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, training data 404 may be in accordance with training data with reference to FIG. 1.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
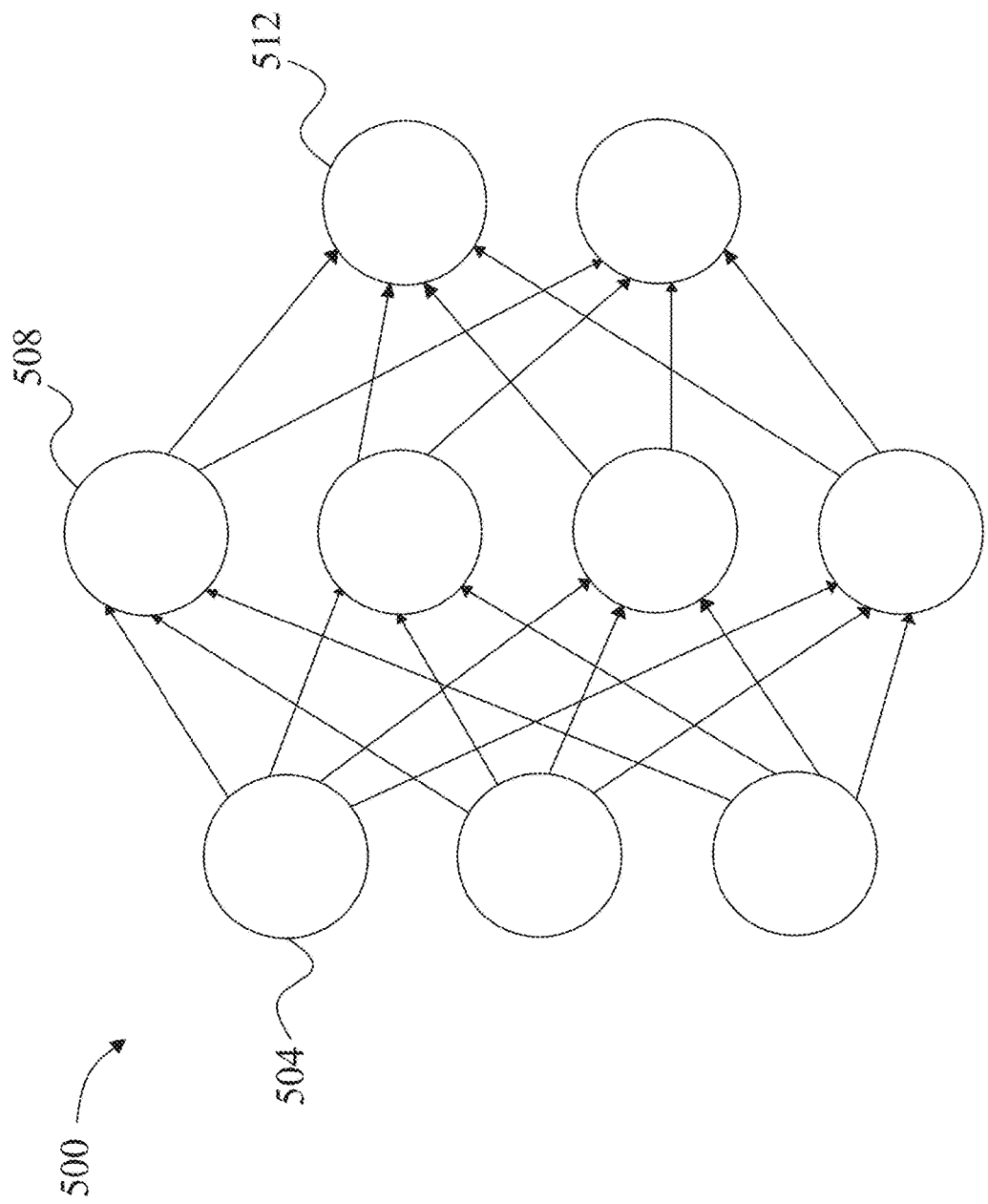
FIG. 5 is a diagram illustrating a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
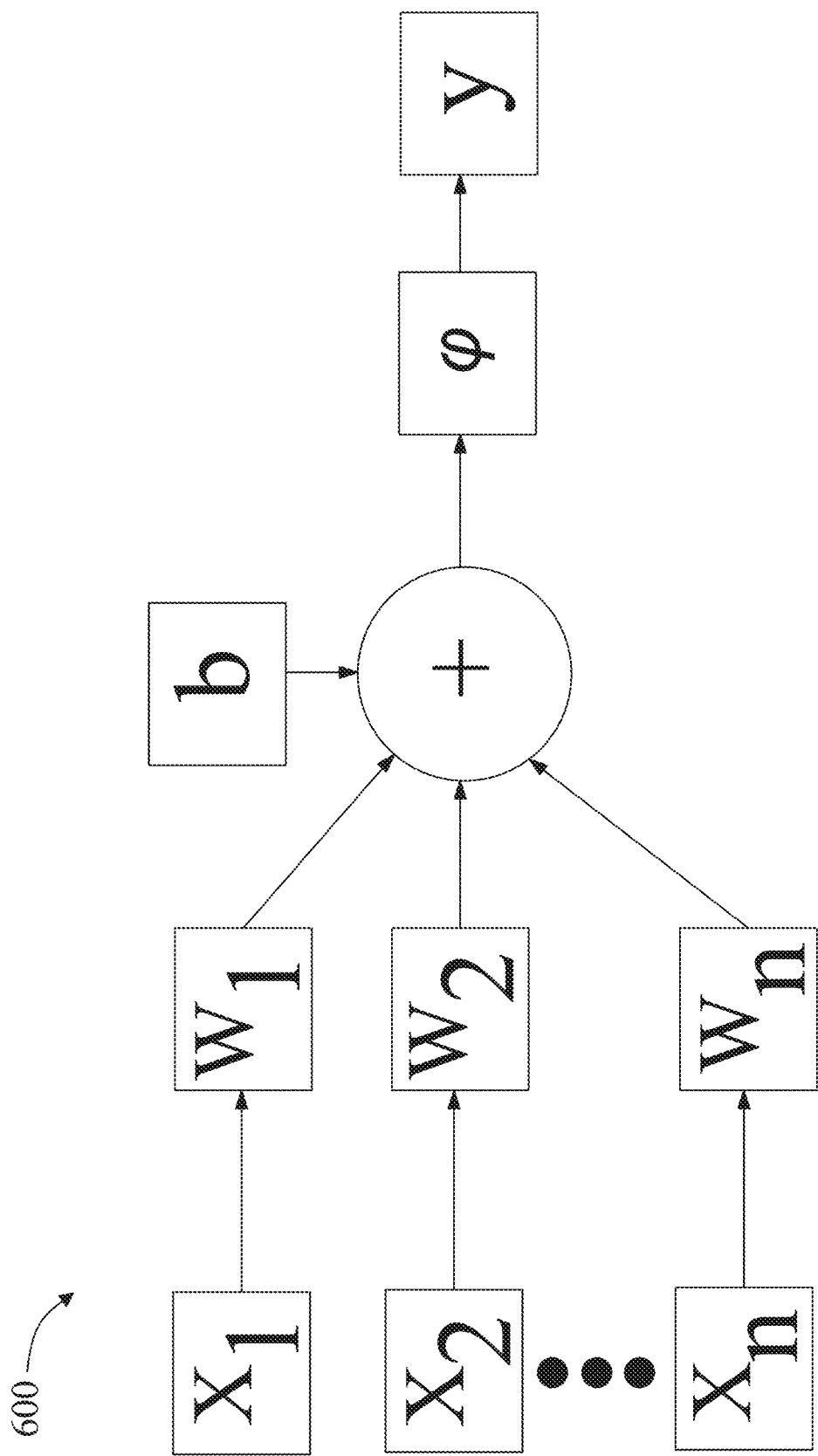
FIG. 6 is a diagram illustrating a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x)=(x)$, a rectified linear unit function such as $f(x)=\max(0, x)$, a "leaky" and/or "parametric" rectified linear unit function such as $f(x)=\max(ax, x)$ for some a, an exponential linear units function such as $f(x)=\{x$ for $x \geq 0$ $\alpha(e^x-1)$ for $x<0$ for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\mathrm{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $f(x)=\lambda\{\alpha(e^x-1)$ for $x<0$ x for $x \geq 0$. Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. As used herein, "module" may refer to a hardware module or a software module. A hardware module is any collection of hardware configured to perform at least a specified task. A software module, conversely, is any collection of software instructions configured to perform at least a specified task.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs, one or more hard disk drives in combination with a computer memory, a distributed storage system such as cloud storage, and the like. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
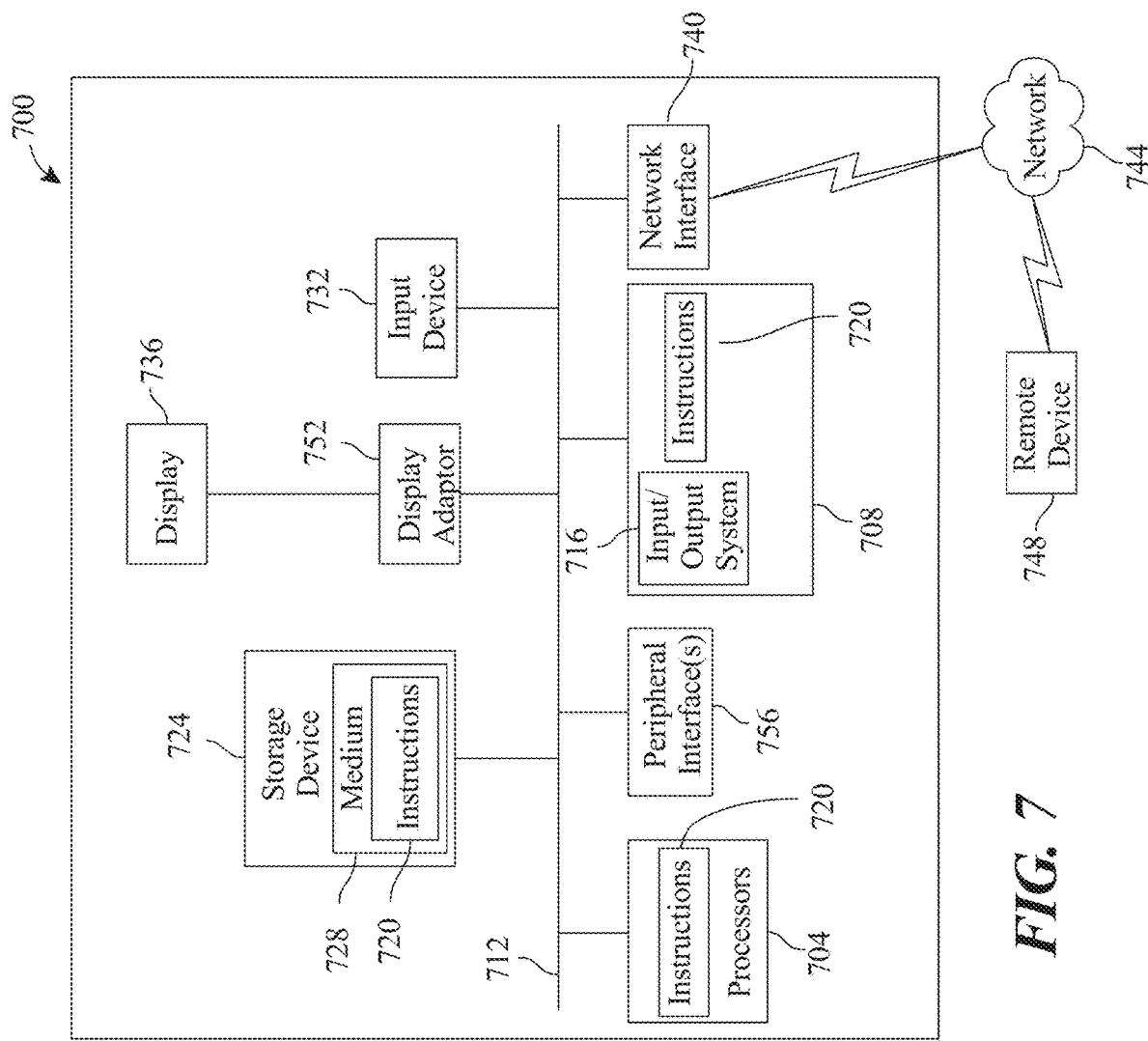
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

If not sufficiently clear from contextual or plain and ordinary usage, the terms "about," "around," "approximately," and "substantially," when used to modify a value, number, figure, quantity, or other term, can be understood to mean ±20% of the modified value, inclusive. For instance, if not sufficiently clear from contextual or plain and ordinary usage, "about 10" can be understood to mean "from 8 to 12 inclusive". If not sufficiently clear from contextual or plain and ordinary usage, the term "relatively" is used to indicate that one of ordinary skill in the art would more closely associate the described value or modifier with the term it modifies (such as high) than another term in a similar class of words (such as low or medium). For instance, if a temperature is described as being "relatively high," one of ordinary skill in the art would more closely associate said temperature with "high" temperatures than "medium" or "low" temperatures. In another example, if a tire pressure between 30-33 psi is considered "standard," then the term "relatively low pressure" would indicate that the stated pressure would be more readily identified by one of ordinary skill in the art as being "low" than being "standard;" for instance, 26 psi.

As used herein, "and/or" is meant to include all possible permutations of "and" and "or". "And/or" may indicate every element of a specified grouping, combinations of less than all elements, or one element. For example, A, B, and/or C can mean any single one of A, B, or C; A and B but not C, B and C but not A, A and C but not B; and A, B, and C together.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A platform-agnostic digital assistant apparatus for electronic communication with a user in a natural language format, the apparatus comprising:
   a processor; and
   a memory, wherein the memory is electronically and communicatively coupled with the processor and storing instructions configuring the processor to:
      receive user data from a storage, wherein the storage comprises user informational contents;
      establish an electronic communication channel with a computing device of an entity, wherein the entity computing device is in communication with the user for providing services to the user, the entity computing device including an interface for receiving digital communication from the user;
      utilize the communication channel to receive a first information related to a user from the entity, wherein the first information comprises communication exchanged between the entity and the user in natural language format for initiating an action on behalf of the user;
      extract at least one user datum from the first information and the user informational contents in the storage;
      determine a user communication style from the user datum, wherein determining the user communication style further comprises:
         analyzing, using the digital assistant, the user datum to determine a first communication style;
         generating, using the digital assistant, first communication style training data based on the first communication style, wherein the first communication style training data comprises correlations between exemplary language elements which correspond to the first communication style, wherein the first communication style training data is labeled in accordance with the first communication style, wherein the language elements comprise at least one of words, tokens of words, and components of the language of the first information;
         training a communication style machine learning model using only the first communication style training data, wherein the training is dynamic as the first information is received, and wherein the model is configured to generate a dynamic response in the determined first communication style; and
         determining, using the communication style machine learning model, an appropriate natural language response in the first communication style, wherein the response is a function of the correlated exemplary language elements;
      modify the informational contents of the storage based on at least one of the user datum and the first information; and
      transmit a response as a function of the appropriate natural language response and the first communication style to the user.

2. The apparatus of claim 1, wherein:
   the processor is further configured to create a single user view, wherein creating the single user view comprises agglomerating user information from one or more sources; and
   wherein the one or more sources include the first information.

3. The apparatus of claim 2, wherein the processor is further configured to modify the informational contents of the storage based on the single user view.

4. The apparatus of claim 1, wherein the communication channel utilizes a third-party platform.

5. The apparatus of claim 1, wherein the entity is not the user.

6. The apparatus of claim 1, wherein the processor is further configured to determine an indemnity outlay based on the user datum.

7. The apparatus of claim 1, wherein:
   the informational contents of the storage contain an indemnity datum for the user; and
   the processor is configured to identify a negative impact on the indemnity datum from the first information.

8. A method for providing platform-agnostic digital assistance for electronic communication with a user in a natural language format, the method comprising:
   receiving, by a processor, user data from a storage containing informational contents;
   establishing, by the processor, a communication channel with a computing device of an entity, wherein the entity computing device is in communication with the user for providing services to the user, the entity computing device including an interface for receiving digital communication from the user;
   utilizing, by the processor, the communication channel to receive a first information related to a user between the processor and the entity, wherein the first information comprises communication exchanged between the entity and the user in natural language format for initiating an action on behalf of the user;
   extracting, by the processor, at least one user datum from the first information and the user informational contents in the storage;
   determining, by the processor, a user communication style from the user datum, wherein determining the user communication style further comprises:

analyzing, using the digital assistant, the user datum to determine a first communication style;

generating, using the digital assistant, first communication style training data based on the first communication style, wherein the first communication style training data comprises correlations between exemplary language elements which correspond to the first communication style, wherein the first communication style training data is labeled in accordance with the first communication style, wherein the language elements comprise at least one of words, tokens of words, and components of the language of the first information;

training a communication style machine learning model using only the first communication style training data, wherein the training is dynamic as the first information is received, and wherein the model is configured to generate a dynamic response in the determined first communication style; and determining, using the communication style machine learning model, an appropriate natural language response in the first communication style, wherein the response is a function of the correlated exemplary language elements;

modifying, by the processor, the informational contents of the storage based on at least one of the user datum and the first information; and transmitting, by the processor, a response as a function of the appropriate natural language response and the first communication style to the user.

9. The method of claim 8, further comprising creating, by the processor, a single user view by agglomerating user information from one or more sources, wherein the one or more sources includes the first information.

10. The method of claim 9, further comprising modifying, by the processor, the informational contents of the storage based on the single user view.

11. The method of claim 8, wherein the communication channel utilizes a third-party platform.

12. The method of claim 8, wherein the entity is not the user.

13. The method of claim 8, further comprising determining, by the processor, an indemnity outlay based on the user datum.

14. The method of claim 8, further comprising identifying, by the processor, a negative impact on an indemnity datum for the user from the first information; wherein the informational contents of the storage contain the indemnity datum.

* * * * *